United States Patent [19]

Peschik

[11] Patent Number: 5,313,743
[45] Date of Patent: May 24, 1994

[54] COOLING APPARATUS FOR GRINDING MACHINES

[75] Inventor: Werner Peschik, Börnsen, Fed. Rep. of Germany

[73] Assignee: Blohm Maschinenbau GmbH, Hamburg, Fed. Rep. of Germany

[21] Appl. No.: 939,075

[22] Filed: Sep. 1, 1992

[30] Foreign Application Priority Data

Sep. 4, 1991 [DE] Fed. Rep. of Germany ....... 4129402

[51] Int. Cl.⁵ .............................................. B24B 55/02
[52] U.S. Cl. ....................................... 51/266; 51/267; 51/322
[58] Field of Search .................. 51/266, 267, 322, 323

[56] References Cited

U.S. PATENT DOCUMENTS

| | | | |
|---|---|---|---|
| 876,087 | 1/1908 | Peirce | 51/267 |
| 3,543,451 | 10/1967 | Smith | 51/267 |
| 4,528,743 | 7/1985 | Bleich | 29/568 |
| 4,737,417 | 4/1988 | Mushardt | 428/571 |
| 4,813,187 | 3/1989 | Mushardt | 51/281 R |
| 4,945,588 | 8/1990 | Mushardt | 125/11.15 |
| 5,013,014 | 5/1991 | Mushardt | 269/7 |

FOREIGN PATENT DOCUMENTS 3422213 1/1985 Fed. Rep. of Germany .
3930247 3/1991 Fed. Rep. of Germany .

Primary Examiner—Bruce M. Kisliuk
Assistant Examiner—Eileen P. Morgan
Attorney, Agent, or Firm—Darby & Darby

[57] ABSTRACT

Apparatus for supplying coolant to the location of contact between a workpiece and a grinding wheel in a grinding machine has one or more reciprocable and indexible carriers each of which removably or fixedly supports two or more different nozzles. This enables each carrier to maintain a selected nozzle in an optimum position for delivery of one or more streams of coolant to the location of contact. At the same time, the other nozzle or nozzles are sealed from a source of coolant so that the coolant is not wasted when a particular nozzle on the carrier is in the process of delivering an optimal quantity of coolant against a workpiece. The nozzles can be removed from their carrier or carriers individually or in groups of two or more. Alternatively, each carrier with all of the nozzles thereon can be replaced with a carrier mounting a different set of nozzles. Nozzles can be exchanged simultaneously with the grinding wheel, and the operation of the cooling apparatus can be automated, for example, in such a way that the stream or streams of coolant issuing from one or more selected nozzles follow the location of contact in a machine wherein such location moves in the course of a grinding operation.

21 Claims, 4 Drawing Sheets

COOLING APPARATUS FOR GRINDING MACHINES

BACKGROUND OF THE INVENTION

The invention relates to machine tools in general, and more particularly to improvements in apparatus for supplying coolant to material removing stations in machine tools, for example, to the locations of contact between a workpiece and a grinding wheel in a grinding machine.

It is known to equip a grinding machine with a nozzle which can discharge one or more jets, sprays or streams of a suitable liquid coolant to the location of contact between a workpiece and a material removing tool, such as a rotary grinding wheel. The nozzle can be trained or aimed upon the location of contact and is connectable to a source of coolant, e.g., by a hose. Such cooling of the location of contact between a workpiece and a grinding tool is not only desirable but actually necessary for the quality of the finished product, especially in a modern grinding machine wherein the tool is expected to remove large quantities of material from a stationary or movably mounted workpiece. Adequate cooling prevents localized overheating of workpieces and thus enhances the quality of the finished products.

It is further known to design a nozzle in such a way that it can supply adequate quantities of coolant in suitable distribution to the location of contact between a large (wide) surface of a workpiece and a suitably profiled (wide) working surface of a rotary grinding wheel or an analogous tool. The nozzle can satisfy the requirements regarding the delivery of adequate quantities of coolant in optimum distribution only as long as the corresponding grinding tool remains installed in the machine and as long as such tool is in the process of removing material from a particular series of workpieces. If the grinding tool is replaced with another tool, or if another profile of the same tool is moved into material removing contact with a workpiece, the nozzle does no longer ensure optimal withdrawal of heat from workpieces. Thus, it is necessary to replace the nozzle with a different nozzle in a time-consuming operation which entails long periods of idleness of the machine. The situation is aggravated if several different profiles of a particular workpiece are to be treated by a set of different tools or by two or more sets of different tools. This necessitates the removal of a previously used grinding tool from the machine. The same applies if the grinding machine is equipped with a manipulator which is capable of automatically exchanging a previously used grinding tool with a different tool during the interval between two successive different treatments of a workpiece in a grinding machine.

It is further known to guide a coolant discharging nozzle in a grinding machine in such a way that the nozzle remains trained upon the location of contact between a workpiece and a grinding tool, even if the position of such location varies in the course of a grinding operation, i.e., the stream or streams of coolant can be caused to follow or track the location of material removal from a workpiece to thus avoid fluctuations in the rate of withdrawal of heat from the workpiece. Reference may be had, for example, to German Pat. No. 39 30 247 Al which discloses a centerless circular grinding machine wherein the orientation of the coolant discharging nozzle varies in dependency on the extent of a reduction of the diameter of the grinding wheel as a result of dressing of the working surface of the grinding wheel in actual use. The intensity of the material removing action of the dressing tool upon the working surface of the grinding wheel is monitored and the orientation of the nozzle which discharges coolant against the workpiece is adjusted accordingly.

German Pat. No. 34 22 213 Al discloses a coolant supplying apparatus which employs nozzles in a distribution such that their orientation partially conforms to the profile of the grinding wheel. The nozzles are mounted for translatory movement on a pivotally mounted protective hood. This enables the nozzles to trail or track, to a certain extent, the location of contact between a workpiece and a grinding wheel. However, the patented apparatus cannot take into consideration the differences between the profile of a previously utilized grinding wheel and the profile of a second grinding wheel which is installed in the grinding machine upon removal of the previously used wheel.

OBJECTS OF THE INVENTION

An object of the invention is to provide a coolant supplying apparatus which is more versatile than heretofore known apparatus and can be installed in existing grinding machines and/or other types of machine tools.

Another object of the invention is to provide a coolant supplying apparatus which renders it possible to shorten the down times of a machine tool for the purposes of changing the setup, e.g., to replace a previously used grinding wheel with a different grinding wheel in circular or other grinding machines.

A further object of the invention is to provide a coolant supplying apparatus which can be designed to automatically select an optimal nozzle or an optimal set of nozzles to withdraw heat from a workpiece during removal of material form such workpiece by a rotary grinding wheel or an analogous tool.

An additional object of the invention is to provide a coolant supplying apparatus which can deliver adequate quantities of coolant to any one of several different locations of contact between a workpiece and a material removing tool.

Still another object of the invention is to provide a grinding machine wherein the coolant supplying nozzle or nozzles can be exchanged simultaneously with other exchangeable parts of the machine.

A further object of the invention is to provide a coolant supplying apparatus whose operation can be automated to any desired extent.

Another object of the invention is to provide a coolant supplying apparatus which can adequately cool a workpiece irrespective of the number of different treatments to which the workpiece must be subjected in a grinding machine or in another machine tool.

An additional object of the invention is to provide a coolant supplying apparatus which can perform the above outlined functions as well as the function of causing one or more streams of coolant to follow or track a shifting location of contact between a workpiece and a grinding tool.

Still another object of the invention is to provide a novel and improved method of reducing the down times of a grinding machine.

A further object of the invention is to provide the coolant supplying apparatus with novel and improved means for carrying, moving and/or otherwise manipulating one or more coolant discharging nozzles.

SUMMARY OF THE INVENTION

The invention is embodied in an apparatus for supplying coolant (e.g., water or oil) to a location of contact between a workpiece and a material removing tool in a grinding machine. The improved apparatus comprises nozzle supporting means including at least one mobile carrier, and a plurality of different coolant discharging nozzles which are provided on the at least one carrier. The at least one carrier is movable between a plurality of different positions in each of which a different nozzle of the plurality of nozzles is trained or aimed upon and can discharge at least one stream of coolant against the aforementioned location of contact. The apparatus further comprises means for supplying coolant to the nozzles.

The coolant supplying means can comprise channels which are provided in the at least one carrier. The arrangement is preferably such that the supplying means supplies coolant only to that nozzle which is trained upon the location of contact. For example, the supplying means can comprise a source of coolant, means for conveying coolant from the source to the at least one carrier, and means for connecting the conduit with that nozzle which is trained upon the location of contact. The at least one carrier preferably comprises or contains or cooperates with means for sealing from the conveying means each nozzle which is not trained upon the location of contact.

The nozzles can have different coolant discharging orifices. The differences can include differences in size, shape, number and/or distribution.

The apparatus can further comprise a support (e.g., a reciprocable slide or carriage) and means for preferably separably connecting tile at least one carrier to the support. The connecting means can include an automatic changer or robot having means for affixing a carrier to and for disconnecting a carrier from the support. Such changer can further comprise means for exchanging tools simultaneously with carriers.

The apparatus can further comprise means for moving the at least one carrier between the plurality of different positions. Thus, if the at least one carrier is rotatable or indexible between its positions, the moving means includes means for rotating the at least one carrier. It is further possible to provide the apparatus with means for imparting to the at least one carrier translatory movements along a predetermined path in addition to the provision of means for rotating or indexing the at least one carrier. For example, the means for imparting translatory movements can comprise a reciprocable carriage for the at least one carrier and for the rotating means. Depending on the nature of the workpieces to be treated and/or on the nature of grinding wheels which are utilized for such treatment, the apparatus can be provided with means for imparting to the at least one carrier translatory movements along a predetermined path and/or with means for indexing or rotating the at least one carrier about its own axis or about a different axis simultaneously with or independently of translatory movements.

For example, the at least one carrier can be reciprocably mounted on a rotary indexible turntable of the grinding machine.

The at least one carrier can be mounted on the wheelhead of the machine.

If the location of contact between the tool and the workpiece is shifted during removal of material from the workpiece, the apparatus can comprise means for imparting to the at least one carrier translatory and/or rotary movements in order to maintain a selected nozzle trained upon the location of contact while such location is being shifted during removal of material from a workpiece.

The nozzle supporting means can further comprise at least one second carrier for a plurality of different nozzles. The location of contact can be disposed between the at least one carrier and the at least one second carrier.

If the material removing tools which are used to treat a particular workpiece have different profiles, or if a tool which is used to treat a workpiece has two or more different profiles, the nozzles on a carrier can include a discrete nozzle for each of the different profiles.

It is possible to equip a carrier with two nozzles having identical orientations and being mirror images of each other. Such carrier can be used in a machine wherein workpieces can or should be treated at several different locations of contact with a tool.

The novel features which are considered as characteristic of the invention are set forth in particular in the appended claims. The improved apparatus itself, however, both as to its construction and its mode of operation, together with additional features and advantages thereof, will be best understood upon perusal of the following detailed description of certain presently preferred specific embodiments with reference to the accompanying drawings.

DESCRIPTION OF THE PREFERRED EMBODIMENTS

Figure 1:
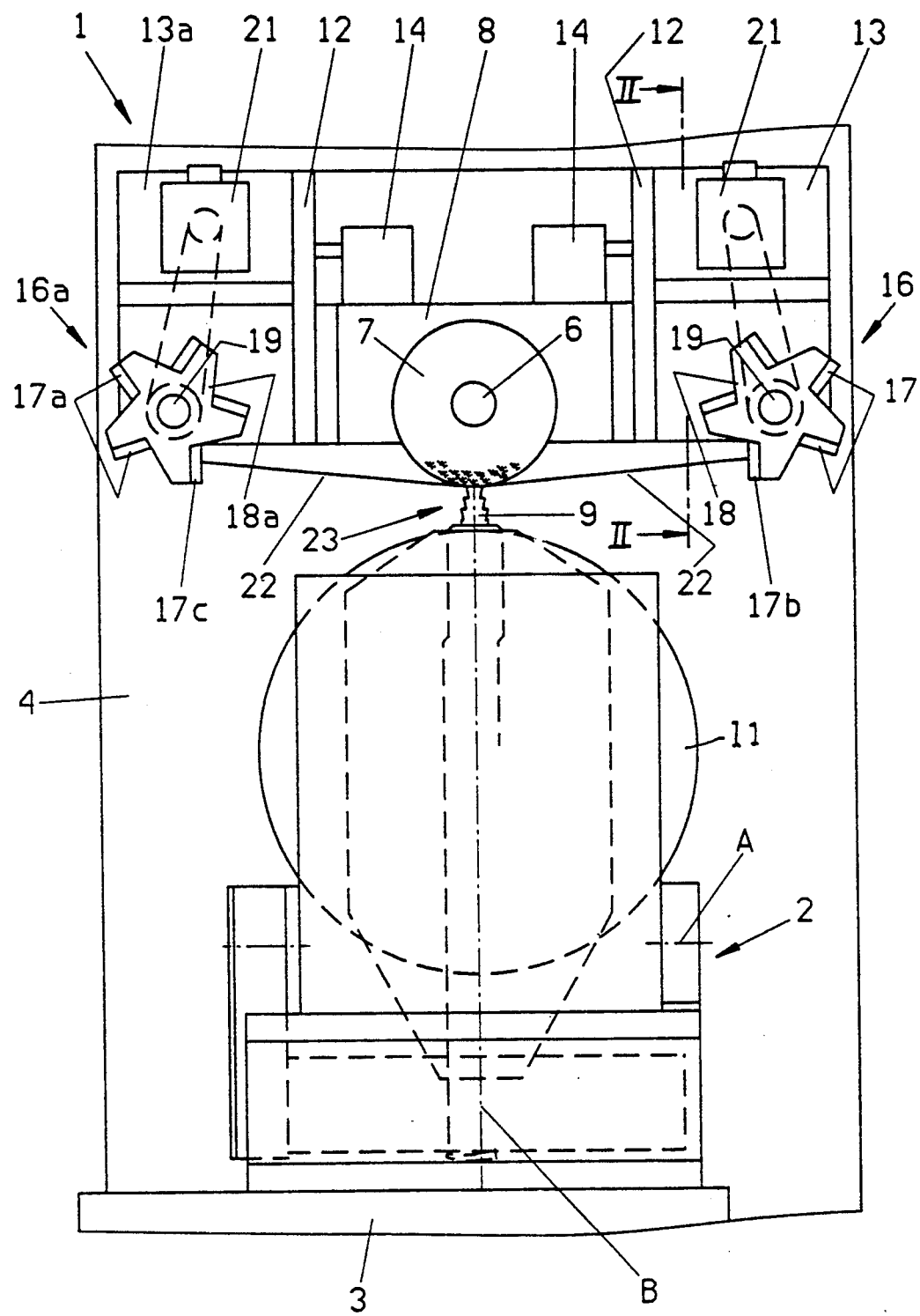
FIG. 1 is a front elevational view of a profile grinding machine which is equipped with a coolant supplying apparatus embodying one form of the present invention.

FIG. 1 is a front elevational view of the working station in a grinding machine 1 wherein a work table 3 supports a work holder 2 and a column 4 carries a vertically movable wheelhead 8 for a grinding spindle 6. The latter mounts a material removing tool 7 here shown as a grinding wheel. The holder 2 supports a workpiece 9, e.g., a turbine blade having a foot-like portion requiring treatment by the working surface of the wheel 7. The workpiece 9 is clamped to a turntable 11 which is movable in a plurality of directions. In the grinding machine 1 of FIG. 1, the turntable 11 can be indexed about a horizontal axis A as well as about a vertical axis B. Such movability of the turntable 11 renders it possible to remove material from three-dimensional surfaces on the workpiece 9. The exact construction of the means for supporting the workpiece 9 in the machine 1 and the exact manner of removing material from the workpiece are known and form no part of the present invention.

The wheelhead 8 is flanked by two carriages 13, 13a which are confined to movement along parallel vertical paths by suitable guides 12 on the column 4. The means for imparting translatory movements to the carriages 13, 13a comprises discrete electric motors 14 or other suitable drive means. The illustrated motors 14 are designed to move the respective carriages 13, 13a independently of each other.

Figure 2:
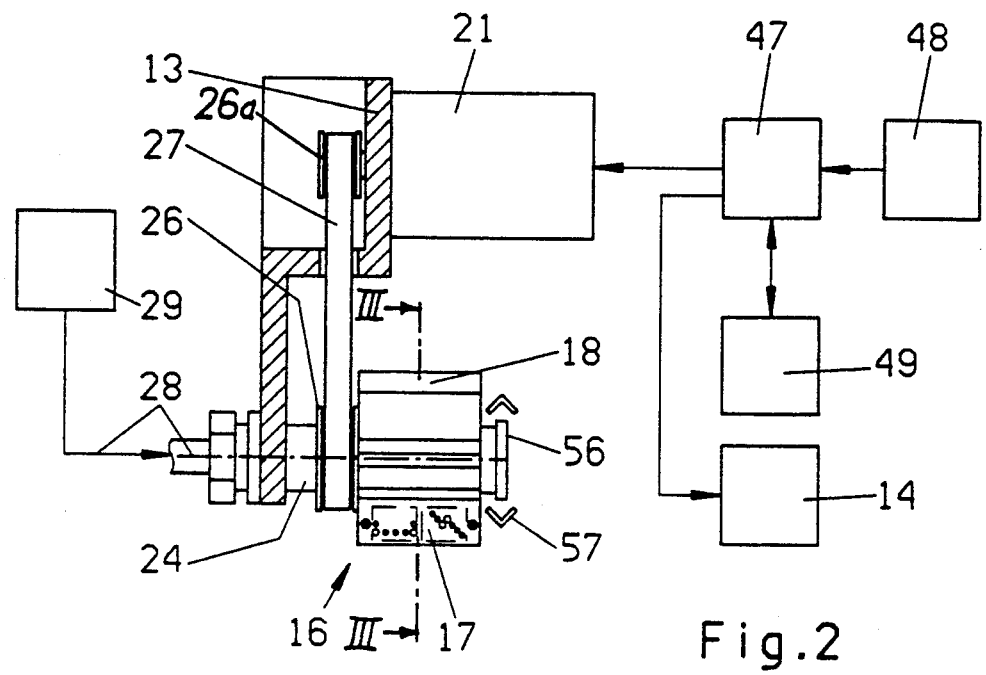
FIG. 2 is a partly diagrammatic and partly sectional view of the coolant supplying apparatus, the section being taken in the direction of arrows as seen from the line II—II in FIG. 1.
Figure 3:
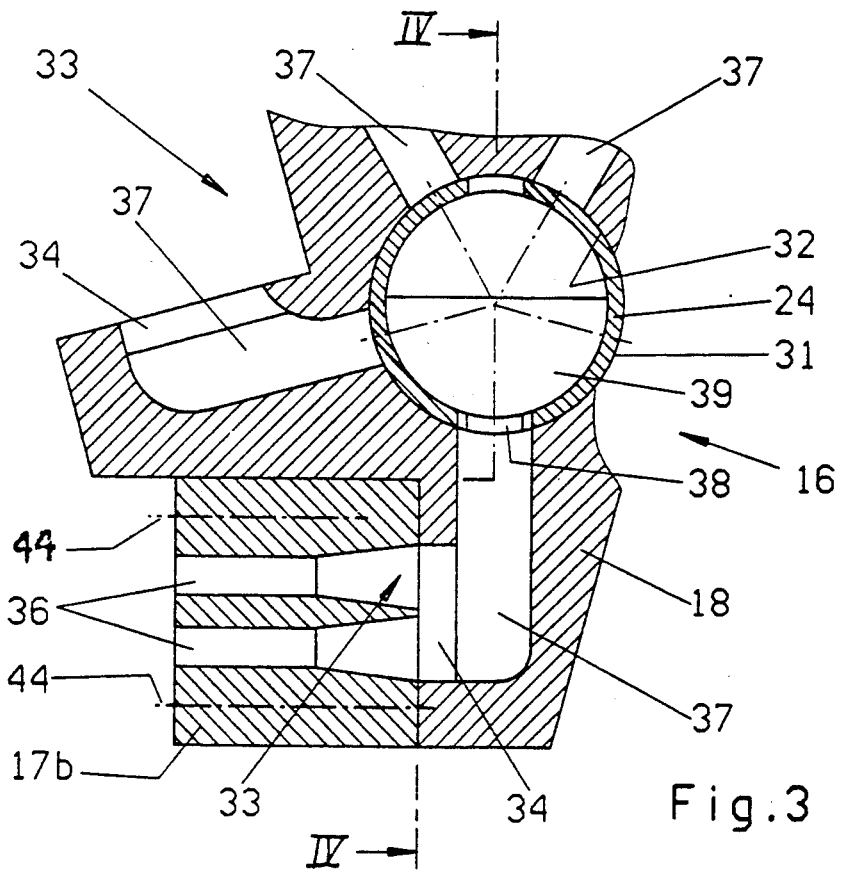
FIG. 3 is an enlarged fragmentary sectional view substantially as seen in the direction of arrows from the line III—III in FIG. 2.
Figure 4:
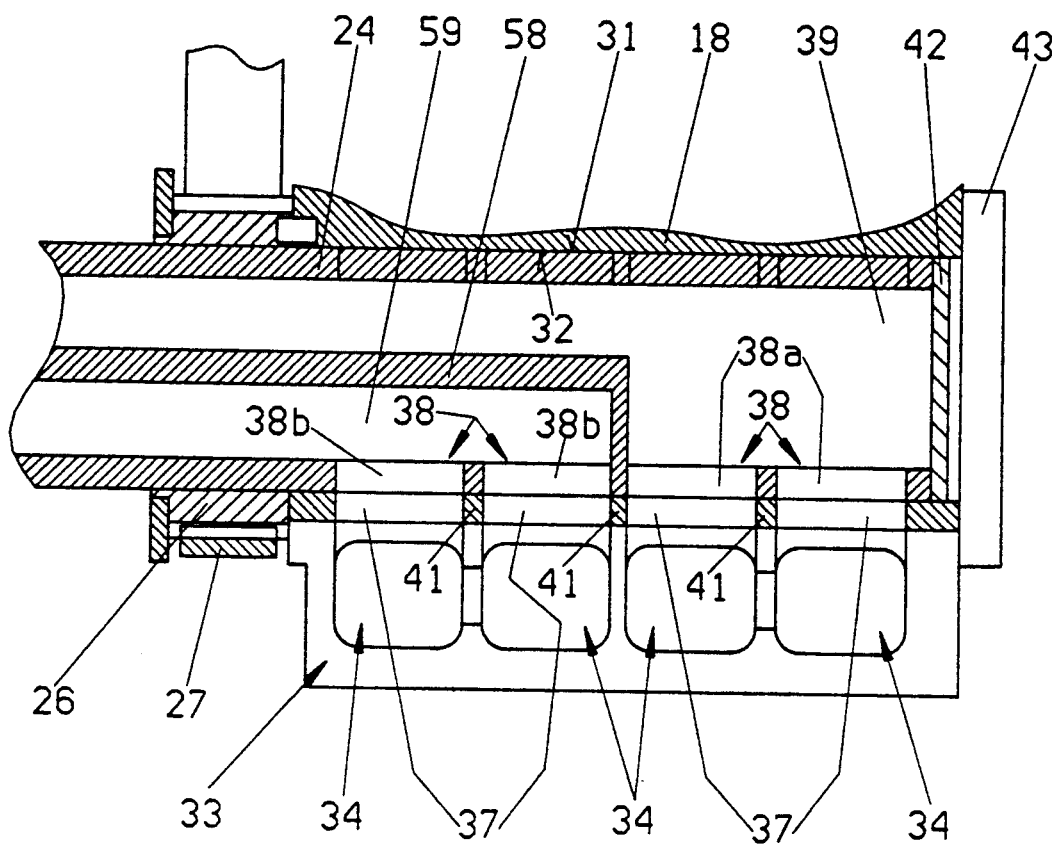
FIG. 4 is a sectional view substantially as seen in the direction of arrows form the line IV—IV in FIG. 3.

The carriages 13 and 13a respectively support mobile carriers 16, 16a which constitute the components of a nozzle supporting assembly and are movable with the respective carriages up and down at the respective sides of the grounding wheel 7. Each of the two carriers 16, 16a is rotatable, or indexible about its own horizontal axis and includes a rotary body 18, 18a mounted for rotation about a stationary hollow shaft 24 (FIGS. 2 to 4). The rotary bodies 18, 18a are provided with shafts 19 which are coaxial with the respective hollow shafts 24 and carry pulleys 26 for endless toothed belts 27 forming part of discrete drives 21 constituting means for rotating the carriers 16 and 16a relative to the associated carriages 13, 13a. The drives 21 are mounted on the respective carriages 13, 13a and are preferably operated by remote control in a manner to be described below.

Each of the rotary bodies 18, 18a supports a set of five detachable nozzles 17 and 17a. Each of the five nozzles 17 is different, and the same holds true for the nozzles 17a. Any selected nozzle 17 or 17a can be trained upon the location 23 of contact between the workpiece 9 and the working surface of the grinding wheel 7 in response to movement of the respective carriage 13, 13a along the adjacent guides 12 and/or in response to indexing of the respective rotary body 18, 18a about its own axis (under the action of the respective drive 21). The nozzles 17 and 17a have orifices 36 (see FIG. 5) which direct streams 22 of a suitable coolant against the location 23 when the respective nozzles are properly trained upon such location. FIG. 1 shows that one (17b) of the nozzles 17 on the rotary body 18 is properly trained upon the location 23, and that the nozzle 17c on the rotary body 18a is also properly trained upon the same location 23 but at the other side of the grinding wheel 7. The following description will deal primarily or exclusively with the construction, mounting and mode of operation of the assembly including the carrier 16, its rotary body 18 and the nozzles 17 because the carrier 16a is a mirror image of the carrier 17.

FIG. 2 is a side elevational view of the carrier 16, and FIGS. 3 and 4 are enlarged fragmentary sectional views of this carrier. The nozzles 17 are installed at the periphery of the rotary body 18 of the carrier 16. The body 18 is indexible about the axis of the hollow shaft 24 which is non-rotatably installed in the carriage 13. The transmission including the pulleys 26, 26a and belt 27 is operable by the drive 21 on the carriage 13 to index the rotary body 18 in order to train a selected nozzle 17 upon the location 23 of contact between the grinding wheel 7 and the workpiece 9 and preferably also to account for a shifting of the location 23 as a result of dressing of the working surface of the wheel 7 and/or as a result of angular displacement of the turntable 11 and workpiece 9 relative to the wheel 7.

The means for supplying a suitable coolant to that nozzle 17 which is trained or aimed upon the location 23 includes a source 29 of coolant, a preferably flexible conduit 28 which connects the source 29 with the rotary body 18, and a system of channels, ports, slots and valves which regulate the flow of coolant from the conduit 28 to a selected nozzle 17, namely to the nozzle (17b in FIGS. 1 and 3) which is trained upon the location 23. The source 29 carries or contains a suitable pump (not specifically shown) which causes the coolant to flow toward the rotary body 18 of the carrier 16 when the grinding machine 1 is in use.

The means for connecting the conduit 28 with a selected nozzle 17 is shown in detail in FIGS. 3 and 4. The non-rotatable hollow shaft 24 has a cylindrical external surface 31 which is in sealing engagement with the cylindrical internal surface 32 of the rotary body 18. The shaft 24 serves as a bearing for the body 18, and the latter has five holders in the form of sockets 33, one for each of the five different nozzles 17. FIG. 3 shows the nozzle 17b of the set of five nozzles 17 in the respective socket 33. Each socket 33 has at least one outlet 34 for admission of coolant from a channel 37 of the rotary body 18 into the orifice or orifices 36 of the respective nozzle 17 (i.e., the nozzle 17b of FIG. 3). The rotary body 18 can be provided with two or more channels 37 for each of the sockets 33 or for some of these sockets. The hollow shaft 24 of FIG. 3 has one or more openings 38 which establish communication between the internal space 39 of this shaft and the channel(s) 37 leading to the outlet or outlets 34 of that socket 33 which releasably receives a nozzle 17 that is trained upon the location 23 of contact between the workpiece 9 and the grinding wheel 7. FIG. 3 shows a slot-shaped opening 38 which is provided in the cylindrical wall of the hollow shaft 24 and extends in parallelism with the axis of this shaft. As can be seen in FIG. 4, the opening or slot 38 is divided into a plurality of (two) sections 38a and 38b by reinforcing webs 41 which are provided for the purpose of avoiding undue weakening of the shaft 24 in the region of the opening 38.

One axial end of the shaft 24 carries a seal 42 which is overlapped by a closure or cap 43 connected to and rotatable with the body 18 of the carrier 16. The nozzle 17b which is shown in FIG. 3 is separably secured to the respective socket 33 by a set of bolts, screws or other suitable fasteners indicated by phantom lines 44. It is often preferred to replace the bolts or screws with suitable quick-release fasteners (e.g., with bayonet mounts or the like) in order to facilitate rapid replacement of nozzles 17 with different nozzles, e.g., by means of a robot or the like.

The slot-shaped opening 38 which is shown in FIGS. 3 and 4 is disposed at the underside of the hollow shaft 34 for the rotary body 18 forming part of the carrier 16. The rotary body 18 seals the passages or channels 37 in four of the five sockets 33 from the internal space 39 of the shaft 24, i.e., from the conduit 28 and coolant source 29. The only socket 33 which receives coolant from the conduit 28 through the opening or slot 38 is the one that carries a nozzle 17 in a position corresponding to that of the nozzle 17b in FIG. 1 or 3. Thus, and as already pointed out hereinbefore, the conduit 28 can convey coolant only to that nozzle 17 whose orifice or orifices 36 can direct one or more jets or streams 22 of coolant against the location 23 of contact between the workpiece 9 and the grinding wheel 7. This ensures predictable withdrawal of heat from the workpiece 9 and results in substantial savings in coolant as well as in energy which is required for delivery of coolant to the rotary body 18. The drive 21 on the carriage 13 can index the rotary body 18 between five different positions in each of which a different nozzle 17 is ready to direct one or more jets or streams 22 of coolant toward the location 23. Furthermore, the nozzle 17 which is properly oriented relative to the location 23 is automatically connected with the source 29, i.e., it can receive coolant through the conduit 24, internal space 39 of the shaft 24, slot or opening 38 in the cylindrical wall of the shaft 24, the channel or channels 37 and the outlet or outlets 34 of the respective socket 33.

Figure 5:
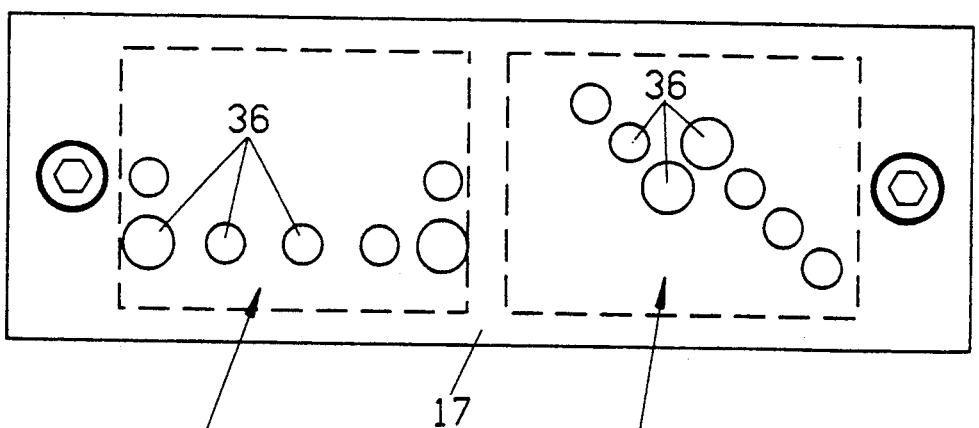
FIG. 5 is a front elevational view of a nozzle.

FIG. 5 shows a nozzle 17 in a front elevational view. This nozzle has two sets or arrays 46 and 46a of orifices 36. The array 46 is designed to permit the discharge of several jets or streams of water, oil or another suitable coolant in a distribution best suited for withdrawal of heat from a workpiece which is being treated by a grinding wheel 7 having a first profile, and the array 46a is designed to permit the discharge of several jets or streams best suited to effectively withdraw heat from a workpiece which is being treated by a grinding wheel having another profile. Analogously, the array 46 can serve to permit the discharge of jets or streams best suited for withdrawal of heat from a workpiece which is being treated by a first part of a grinding wheel 7, namely by a part having a first profile, and the array 46a can serve to permit the discharge of jets or streams best suited to permit optimum withdrawal of heat from the same workpiece or from another workpiece while the workpiece is being treated by another part of the same grinding wheel.

At least one of the sets or arrays 46, 46a of nozzles 36 can be replaced with one or more slit-shaped nozzles without departing from the spirit of the invention. All that counts is that each nozzle 17, or the array or arrays of orifices 36 in each nozzle, can ensure satisfactory or optimal cooling of a workpiece which is being treated by a particular grinding tool. The provision of a plurality of arrays of orifices 36 (such as the arrays 46 and 46a which are shown in FIG. 5) exhibits the advantage that a total of five discrete nozzles 17 can discharge more than five different coolant streams 22, for example, a total of ten different streams 22 if each of a total of five nozzles which are connectable to the rotary body 18 of the carrier 16 is provided with two sets or arrays of orifices 36 or of otherwise distributed and/or dimensioned orifices. The number of orifices 36 in an array 46 or 46a can be as low as one or can be any other number which is satisfactory for ensuring the discharge of a single stream 22 or a composite stream 22 best suited to properly cool a particular workpiece or a workpiece which is being treated by a particular grinding tool 7 or by one of a group of two or more different profiles on a single grinding tool.

In order to ensure that the orifices 36 of the array or set 46 can receive coolant independently of the orifices of the set or array 46a, or vice versa, the internal space 39 of the non-rotatable hollow shaft 24 contains a partition 58 which separates from the space 39 a chamber 59. The partition 58 is installed in such a way that the orifices 36 of the array 46a receive coolant from the conduit 28 through that portion of the internal space 39 which is separated from the chamber 59 by the partition 58, through the sections 38a of the slot or opening 38, through one or more channels 37 provided in the rotary body 18 and leading to the outlet or outlets 34 in communication with the orifices 36 of the arrays 46a, and thence into the atmosphere to form the respective composite stream 22 impinging upon the location 23 when the grinding machine 1 is in actual use. The orifices 36 of the array 46 receive coolant from the chamber 58 through the sections 38b of the slot 38 in the wall of the hollow shaft 24, through the corresponding channels(s) 37, through the corresponding outlets 34 of the respective socket 33 and into the atmosphere to form a stream 22 which impinges upon the location 23 when the machine 1 is in actual use. An adjustable valve is provided to seal the sections 38a or 38b of the opening 38 from the conduit 28.

In accordance with a presently preferred embodiment, and as shown schematically in FIG. 2, the operation of the improved apparatus can be regulated by a numerical control (NC) system 47 of the grinding machine 1. The control system 47 serves to transmit signals to the rotary drives 21 as well as to the drives 14 for the carriers 16 and 16a. This control system is further designed to ensure such operation of the drives 14 and 21 that the streams 22 of coolant can trail or follow the movements of the location 23 of contact between the grinding wheel 7 and a workpiece 9. A keyboard 48 or other suitable inputting unit is provided to transmit data or programs to the control system 47, and the latter is further connected with a memory 49 for storage of various programs or data. The control system 47 addresses the memory 49 for retrieval of a particular set of data or of a particular program depending on the nature of the workpiece 9 to be treated and/or on the type of the grinding tool 7 which is to be used to remove material from the workpiece at the location 23. The control system 47 regulates the operation of the drives 14 and 21 in such a way that the two streams 22 of coolant continue to impinge upon the location 23 of contact between a workpiece 9 and the grinding tool 7 on the shaft 6 of the wheelhead 8 even if the location 23 migrates, e.g., as a result of wear upon the tool 7 due to engagement by the workpiece 9 and/or due to continuous or intermittent dressing of the working surface of the tool 7. A dressing tool is shown in FIG. 6, as at 54.

Figure 6:
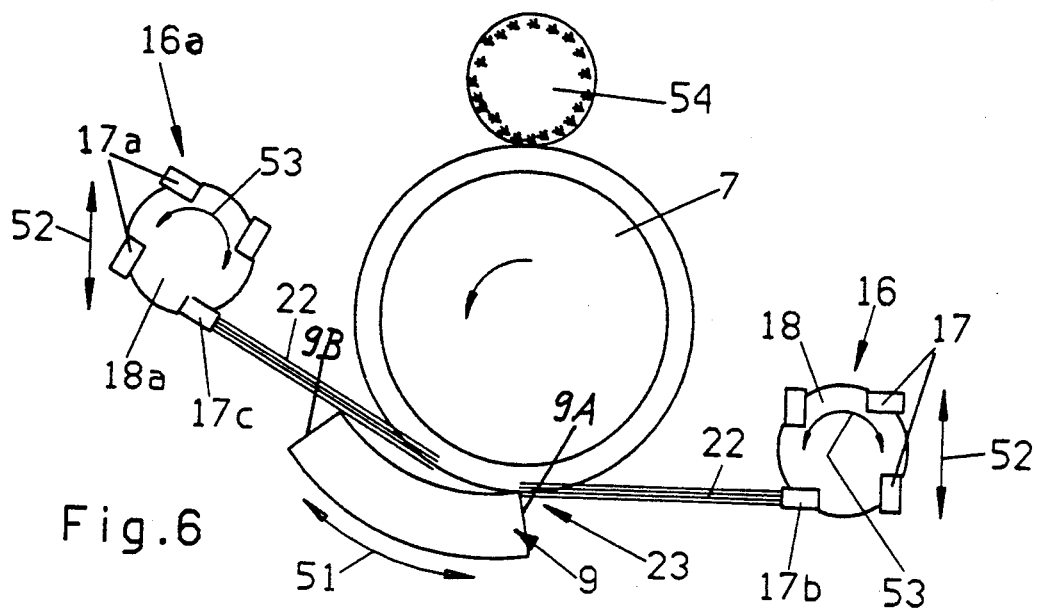
FIG. 6 is a schematic front elevational view of a portion of a second coolant supplying apparatus.

FIG. 6 illustrates a portion of a grinding machine wherein the coolant supplying apparatus comprises a nozzle supporting means again composed of two carriers 16, 16a each of which has a rotary body 18, 18a with four sockets for a maximum of four discrete equidistant coolant discharging nozzles 17 and 17a, respectively. One of the nozzles 17 (namely the nozzle 17b) is properly oriented so that its orifice or orifices discharge a coolant stream 22 impinging upon the location 23 of contact between a profiled grinding wheel 7 and a workpiece 9. The nozzles 17 and 17a are detachable from the respective rotary bodies 18, 18a in a manner as already described with reference to FIGS. 1 to 5.

The workpiece 9 of FIG. 6 has a concave surface which is to be treated by one of two or more grinding wheels 7 each having a particular profile. The workpiece 9 can be moved back and forth in the directions indicated by a double-headed arrow 51. When the grinding machine embodying the structure of FIG. 6 is in use, two properly oriented or indexed nozzles 17 and 17a (and more specifically the nozzles 17b, 17c) each emit two rather substantial jets 22 of a suitable coolant, and the location 23 of contact between the workpiece 9 of FIG. 8 can migrate (clockwise or counter-clockwise of the grinding wheel 7) in order to compensate for one or more variables (such as the angular position of the workpiece 9 (as seen in the directions of the double-headed arrow 51) with reference to the machine frame and/or the wear upon the grinding tool 7 under the action of the dressing tool 54). The required movements are imparted by the respective drives 14 and 21 (not shown in FIG. 6) in response to appropriate signals from the numerical control system 47. If the rotary bodies 18, 18a of the carriers 16, 16a shown in FIG. 6 were not movable up and down (arrows 52) in response to transmission of motion from the respective linear drives 14, at least one of the streams 22 would be incapable of impinging upon the location 23 of contact if the angular position of the workpiece 9 of FIG. 6 were changed by moving this workpiece by the turntable 11 of FIG. 1 or in any other suitable way. It will be readily appreciated that, if the rotary devices 18, 18a were not movable up and down in directions indicated by the double-headed arrows 52, angular displacement of the workpiece 9 in one of the directions indicated by the arrow 51 would invariably result in such alteration of the position of the location 23 that this location could not be reached by at least one of the streams 22. An edge of the workpiece 9 would then intercept one of the streams 22 ahead of the location 23, i.e., the trajectory of one of the streams 22 would be shorter than shown because it would be intercepted, either entirely or in part, by one of the edge faces 9A, 9B. Of course, movements of the rotary bodies 18, 18a in directions indicated by the arrows 52 are synchronized with angular movements in directions indicated by the arrows 53 (i.e., about the axes of the respective rotary bodies) to further reduce the likelihood of premature interception of the one or the other stream 22. This ensures optimal withdrawal of heat from the workpiece 9 at the location 23 and hence optimal removal of material from such workpiece and high quality of the finished product.

FIG. 6 shows that each of the carriers 16, 16a is designed to accept a total of four nozzles 17, 17a, respectively. It will be appreciated that the number of nozzles can be reduced to one or increased to two, three or five or more without departing from the spirit of the invention. The control system 47 is designed to take into account the extent of wear upon the working surface of the grinding tool 7 as a result of removal of material of the tool 7 by the dressing tool 54. The reduction of the diameter of the dressing tool 54 entails a shifting of the position of the location 23 and can be compensated for by appropriate movements of the carriers 16, 16a in the directions indicated by the arrows 52.

The indexing of the carriers 16, 16a for the purpose of moving selected nozzles 17, 17a to the positions respectively corresponding to those occupied by the nozzles 17b, 17c of FIG. 6 can be initiated by hand or automatically by the control system 47.

Figure 7:
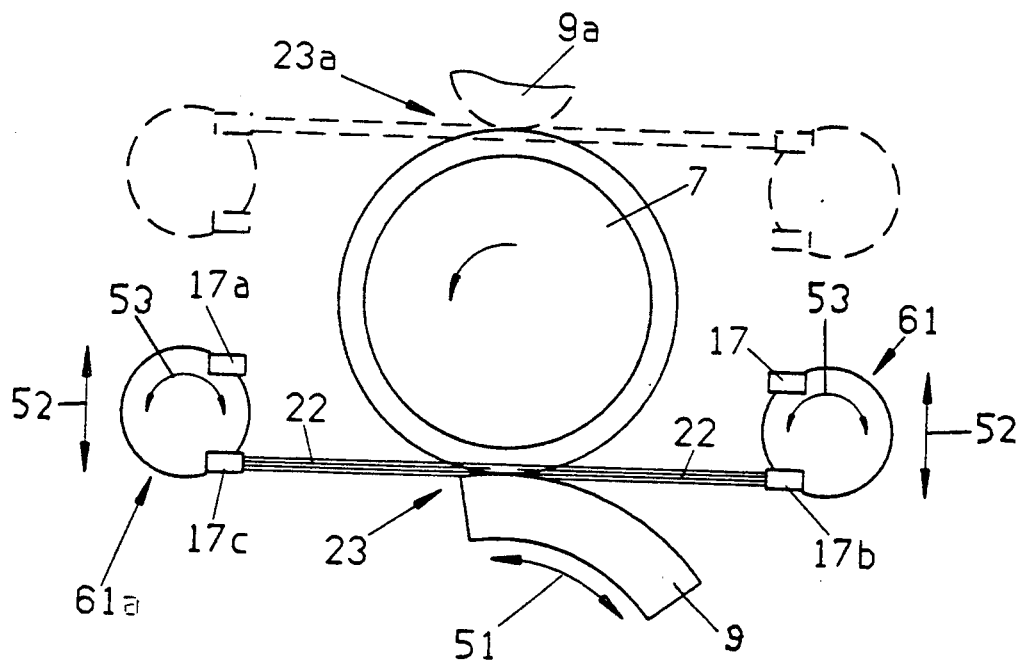
FIG. 7 is a similar schematic front elevational view of a portion of a third coolant supplying apparatus, with the carriers of nozzles shown in two different positions.

FIG. 7 shows a further coolant supplying apparatus for use in a grinding machine wherein the grinding tool 7 can simultaneously treat two workpieces 9, 9a or can treat a workpiece 9 or 9a at the selected one of two different locations 23, 23a. The locations 23, 23a are disposed diametrically opposite each other with reference to the axis of the rotary material removing tool 7. The workpiece 9 in the lower portion of FIG. 7 can be identical with the workpiece 9 of FIG. 6 except that its orientation is different, i.e., the tool 7 of FIG. 7 is in the process of removing material from the convex side of the workpiece 9. During removal of material from its convex surface, the workpiece 9 is moved relative to the grinding wheel 7 in one of the two directions which are indicated by a double-headed arrow 51. The rotary bodies of the carriers 61, 61a which are shown in FIG. 7 can retain their positions (as seen in the direction of arrows 52) while the working surface of the grinding tool 7 treats the convex surface of the workpiece 9. The reason is that the convex surface of the workpiece 9 and/or the two lateral surfaces of this workpiece cannot interfere with propagation of the two streams 22 all the way to the location 23 where the tool 7 removes material from the workpiece 9.

The carrier 61 removably supports two nozzles 17 whose orientation toward the location 23 is the same and which are mirror images of each other with reference to a plane including the axis of rotation of the carrier 61. The same holds true for the nozzles 17a on the rotary body of the carrier 61a. Such orientation of nozzles 17 and 17a renders it possible to utilize the coolant supplying apparatus embodying the structure of FIG. 7 to adequately cool a workpiece 9 at one side of the grinding tool 7 or a workpiece 9a (e.g., a cylinder or the like) at the other or opposite side of the grinding tool. All that is necessary is to impart to the carriers 61 and 61a a translatory or linear movement in one of the directions which are indicated by the arrows 52. The extent of linear movement of the carriers 61, 61a between the solid-line positions and the broken-line positions of FIG. 7 is relatively small and actually negligible. On the other hand, such design and such movability of the carriers 61, 61a and of the nozzles 17, 17a thereon render it possible to save a substantial amount of space because one and the same cooling apparatus can be used to remove material at two different material removing stations of one and the same grinding machine.

Referring again to FIG. 2, the nozzle 17 which is shown therein can be installed in the respective socket 33 of the carrier 16 in such a way that it can be affixed to the rotary body 18 or detached from such rotary body by a suitable manipulator having jaws, grippers or claws 57 engageable with a suitably configurated projection or flange 56 on the nozzle 17 or carrier 16. This further enhances the versatility of the improved coolant supplying apparatus because the manipulator can affix to the carrier 16 a practically infinite number of different nozzles 17. The manipulator including the grippers 57 can be maintained in a state of readiness to proceed with an exchange of nozzles 17 as soon as the grinding machine 1 has completed the treatment of a workpiece 9 or of a series of identical or similar workpieces. This shortens the intervals of idleness of the grinding machine between changes of setup.

The manipulator including the grippers 57, or another suitable manipulator, can be designed to detach an entire carrier 16 or 16a when the treatment of a particular workpiece or of a series of identical workpieces is completed. This even further simplifies the changes of setup because any desired number of carriers with a series of nozzles 17 or 17a can be maintained in a state of readiness so that the manipulator simply detaches a previously utilized carrier 16 or 16a and replaces it with a different or identical carrier supporting the same number or a different number of different nozzles. The flange 56 which is shown in FIG. 2 can be provided on the carrier 16 if the manipulator including the grippers 57 is designed to replace a previously used carrier with a fresh carrier. The carriers which are not in use can be stored in a suitable magazine, e.g., in a manner as is customary for the storage of spare grinding wheels. Reference may be had, for example, to commonly owned U.S. Pat. No. 4,528,743 granted Jul. 16, 1985 to Ralf Bleich for "Grinding machine with magazine for spare grinding wheels". Fixtures for workpieces in the form of twin turbine blades are disclosed in commonly owned U.S. Pat. No. 4,737,417 granted Apr. 12, 1988 to Heinrich Mushardt et al. for "Fixture for holding composite workpieces" to which reference may he had, if necessary. Reference may also be had to commonly owned U.S. Pat. No. 5,013,014 granted May 7, 1991 to Heinrich Mushardt for "Fixture for workpieces, particularly turbine blades". A method of dressing grinding wheels is disclosed in commonly owned U.S. Pat. No. 4,945,888 granted Aug. 7, 1990 to Heinrich Mushardt et al. A method of grinding concave or convex surfaces of workpieces is disclosed in commonly owned U.S. Pat. No. 4,813,187 granted Mar. 21, 1989 to Heinrich Mushardt for "Method of grinding arcuate surfaces of workpieces".

It is further within the purview of the invention to employ a manipulator which can be used (a) for simultaneous exchange of grinding tools 7 and nozzles 17 or 17a or (b) for simultaneous exchange of grinding tools 7 and entire carriers 16 or 16a (or 61 or 61a). This even further shortens the down times during a change of setup.

The carrier 16 and/or 16a, or the carrier 61 or 61a can be mounted on the wheelhead 8 of the grinding machine 1 without departing from the spirit of the invention.

An important advantage of a presently preferred coolant supplying apparatus (such as the apparatus of FIGS. 1 to 5) is that the apparatus can maintain a large number of nozzles in positions of readiness for the delivery of optimal quantities of coolant in dependency on any one of a number of different parameters including the area of contact between a workpiece and a grinding wheel, the profile of that portion of a grinding wheel which is used to remove material from a workpiece, the extent of removal of material from a workpiece, the hardness and/or other relevant characteristics of the workpiece, the extent of migration of the location of contact between a workpiece and the grinding tool, the extent of reduction of the diameter of a continuously or intermittently dressed grinding wheel and/or others. All that is necessary is to select a different nozzle or a different pair nozzles when the treatment of a set of workpieces is completed or when a particular stage of multi-stage treatment of a workpiece is concluded. Such construction of the improved coolant supplying apparatus greatly reduces the cost of changing the setup of the machine, not only because the changes are simpler and can be carried out with a high degree of precision but also because the down times of the machine are shortened. In addition, the improved coolant supplying apparatus contributes to more satisfactory quality of treated articles because it ensures optimal withdrawal of heat during each and every stage or phase of treatment of a single workpiece (e.g., with two or more different grinding tools or with two or more different profiles of a particular grinding tool). In fact, the down times due to a change of setup can be eliminated altogether if the carriers 16, 16a or 61, 61a are designed to releasably support relatively large numbers of different nozzles 17 and/or 17a. The number of nozzles which are installed in the improved coolant supplying apparatus at any particular time can be selected practically at will, especially if each nozzle is designed to furnish two or more different streams 22 of coolant, e.g., in a manner as described with reference to FIG. 5.

A further advantage of the improved coolant supplying apparatus is that its operation can be automated to any desired extent. This further contributes to higher output of the grinding machine and renders it possibly reduce the number of attendants with resulting savings in cost.

The drives 14 and/or 21 can be started and arrested by hand, or such manual operation can be resorted to only when the automatic operating system (using the NC control or an analogous system) is out of commission. In many instances, it is desirable and advantageous to avoid extensive or any manual operation of the coolant supplying apparatus or of any other constituents of the grinding machine. Complete automation can be achieved, for example, if the replacement of nozzles 17 and/or 17a takes place simultaneously with the replacement of grinding wheels.

The provision of means (such as the control system 47) for ensuring that the stream or streams 22 continue to impinge upon the location 23 or 23a of contact between a workpiece and a material removing tool further enhances the reliability of the improved coolant supplying apparatus in that the apparatus can respond even to minor changes of the diameter of a rotary material removing tool to this even more reliably ensure adequate withdrawal of heat from a workpiece 9 or 9a during each and every stage of treatment in the grinding machine.

A further important advantage of the improved coolant supplying apparatus is that it can discharge adequate quantities of coolant in an economical manner. Thus, the apparatus can ensure that coolant is supplied only to that nozzle or only to those nozzles which is or are maintained in proper position(s) so that its or their orifices can discharge one or more streams of coolant against the location 23 of contact between the workpiece and the material removing tool.

The number of nozzles which can be exchanged in a simultaneous operation can vary. For example, the grinding machine can be designed to remove all of the nozzles 17 and/or 17a in a single step and to install an entirely different set of five nozzles 17 and/or 17a in an immediately following step. Alternatively, the nozzles 17 or 17a can be removed one at a time, two at a time or less than five at a time. If extremely rapid replacement of a previously utilized group of nozzles 17 or 17a with a different group is of particular importance, the manipulator or manipulators (including the grippers 57 or the like) can be designed to replace entire carriers 16, 16a, 61 and/or 61a with all of the nozzles 17 or 17a thereon. Additional savings in time are achieved if the replacement of nozzles, groups of nozzles or carriers takes place simultaneously with replacement of grinding tools. All of the nozzles, or some of the nozzles, need not be replaced simultaneously with each exchange of material removing tools. For example, each of the carriers 16, 16a can support a sufficient number of nozzles to ensure that the overall number of such nozzles suffices to guarantee adequate cooling of workpieces which are configured and/or dimensioned in such a way that complete treatment of a workpiece necessitates the removal of material with two or more different tools.

Each carrier 16, 16a or 61, 61a can be provided with two or more sockets 33 or with other suitable nozzle holders which form a row rather than an annulus as shown in FIG. 1. The construction which is shown in FIG. 1 is preferred because a substantial number of different nozzles 17 or 17a can he mounted on a relatively small carrier 16 or 16a which takes up a small amount of space in the grinding machine. Relatively small (compact) carriers can be readily mounted on the wheelhead 8 of the grinding machine 1 which is shown in FIG. 1.

Without further analysis, the foregoing will so fully reveal the gist of the present invention that others can, by applying current knowledge, readily adapt it for various applications without omitting features that, from the standpoint of prior art, fairly constitute essential characteristics of the generic and specific aspects of my contribution to the art and, therefore, such adaptations should and are intended to be comprehended within the meaning and range of equivalence of the appended claims.

I claim:

1. Apparatus for supplying coolant to a location of contact between a workpiece and a material removing tool operating in a machine, said apparatus comprising:
   nozzle supporting means including at least one mobile carrier;
   a plurality of different coolant discharging nozzles provided on said at least one carrier, said at least one carrier being translationally and rotatably movable between a plurality of different positions at which one selected nozzle of said plurality of nozzles can be directed toward and can discharge a coolant stream against said location; and
   means for supplying coolant to said nozzles.

2. The apparatus of claim 1, wherein said supplying means comprises channels in said at least one carrier.

3. The apparatus of claim 1, wherein said supplying means comprises a source of coolant, means for conveying coolant from said source to said at least one carrier, and means for connecting a conduit between said source and said selected nozzle.

4. The apparatus of claim 3, further comprising means for sealing from said coolant conveying means each said nozzle which is not directed toward said location.

5. The apparatus of claim 1, wherein said at least one carrier comprises a discrete holder for each of said plurality of nozzles and means for releasably coupling said nozzles to the respective holders, said supplying means comprising channels provided in said at least one carrier between said conveying means and the nozzles in the respective holders.

6. The apparatus of claim 5, wherein at least one of said nozzles has more than one coolant discharging orifices.

7. The apparatus of claim 1, further comprising a support for positioning said apparatus for supplying coolant relative to said machine that removes material at said location, and means for releasibly connecting said at least one carrier to said support, whereby a carrier may be replaced with another carrier.

8. The apparatus of claim 7, wherein said connecting means includes an automatic changer having means for affixing said at least one carrier to and for disconnecting said at least one carrier from said support.

9. The apparatus of claim 1, further comprising means for moving said at least one carrier between said positions.

10. The apparatus of claim 1, wherein said at least one carrier is reciprocable between said positions along a predetermined path.

11. The apparatus of claim 10, further comprising means for moving said at least one carrier along said path.

12. The apparatus of claim 10, further comprising an indexible turntable, said carrier being reciprocably mounted on said turntable.

13. The apparatus of claim 1 for supplying coolant in a machine having a wheelhead for said tool, wherein said at least one carrier is mounted on said wheelhead.

14. The apparatus of claim 1 for supplying coolant wherein workpieces are treated by material removing tools having different profiles, said different nozzles including a discrete nozzle for each of said different profiles.

15. Apparatus for supplying coolant to a location of contact between a workpiece and a material removing tool, comprising nozzle supporting means including at least one mobile carrier, a plurality of different coolant discharging nozzles provided on said at least one carrier, said at least one carrier being movable between a plurality of different positions at which one selected nozzle of said plurality of nozzles can be directed toward and can discharge a coolant stream against said location; and means for supplying coolant to said nozzles, said coolant supplying means including means for channeling coolant only to that one selected nozzle which is directed to discharge coolant upon said location.

16. Apparatus for supplying coolant to a location of contact between a workpiece and a material removing tool, comprising:
   nozzle supporting means including at least one mobile carrier;
   a plurality of different coolant discharging nozzles provided on said at least one carrier, said at least one carrier being movable between a plurality of different positions at which a selected nozzle of said plurality of nozzles is directable toward and can discharge a coolant stream against said location; and
   means for supplying coolant to said nozzles;
   said at least one carrier being rotatable between said positions, and
   further comprising means for rotating said at least one carrier.

17. The apparatus of claim 16, further comprising means for imparting to said at least one carrier translational movements along a predetermined path.

18. The apparatus of claim 17, wherein said means for imparting translational movements comprises a reciprocable carriage for said at least one carrier and said rotating means.

19. Apparatus for supplying coolant to a location of contact between a workpiece and a material removing tool operating in a machine, said apparatus comprising nozzle supporting means including at least one mobile carrier; a plurality of different coolant discharging nozzles provided on said at least one carrier, said at least one carrier being movable between a plurality of different positions at which one selected nozzle of said plurality of nozzles can be directed toward and can discharge a coolant stream against said location; and means for supplying coolant to said nozzles,
   wherein in said machine said location is shifted during removal of material from said workpiece, further comprising means for imparting to said at least one carrier translational and rotary movements to maintain said selected nozzle directed toward said location while the location is being shifted during removal of material from said workpiece.

20. Apparatus for supplying coolant to a location of contact between a workpiece and a material removing tool, comprising nozzle supporting means including at least two mobile carriers; a respective plurality of different coolant discharging nozzles being provided on each of said at least two carriers, said carriers being rotatably movable between a plurality of different positions at which a nozzle of each said respective plurality of nozzles can be directed toward and can discharge a respective coolant stream against said location said carriers being on opposite sides of said location; and means for supplying coolant to said nozzles.

21. The apparatus of claim 20, wherein, in use, discharging nozzles on said respective carriers are positioned relative to said location of material removal as mirror images of each other.

* * * * *